Patented May 13, 1952

2,596,960

UNITED STATES PATENT OFFICE 2,596,960

BRIGHT DRYING FINISHING COMPOSITION

Daniel Schoenholz, Bronx, and Herbert Terry, New York, N. Y., assignors to Foster D. Snell Inc., a corporation of New York No Drawing. Application February 7, 1947, Serial No. 727,284

4 Claims. (Cl. 260—27)

This invention relates to a method for finishing surfaces and to a resin composition that, when applied as a thin layer upon a surface and allowed to dry, gives a bright film without polishing. More particularly the invention relates to a special polyvinyl resin emulsion.

The invention is especially useful in connection with the finishing of floor surfaces of wood, linoleum, asphalt tile, and concrete. It will be illustrated in connection with such use.

There is no successful commercial use known to us of bright drying aqueous emulsions of resins. In the case of pyroxylin lacquers, on the other hand, there have been made special formulations for the aqueous emulsions seeking to assure substantially complete evaporation of the water at an early stage in the drying, so as to leave behind, near the end of the evaporation, a solvent solution of the pyroxylin.

We have now discovered a composition and method which makes satisfactory and desirable the use of aqueous emulsions of the selected resin composition, not only with large economy but also with satisfactory wear resistance. This composition includes a retarder of the evaporation of water, so as to cause persistence of the aqueous emulsion until near the very end of the drying period.

In the preferred embodiment, our invention comprises the herein described method and an aqueous emulsion comprising (1) a polyvinyl resin of kind to be described and in the form of very fine particles, suitably of average size not substantially larger than 0.6 micron; (2) a non-cationic surface active agent, (3) a film coalescing agent, and (4) a retarder of evaporation of water, the said agent and retarder causing coalescence of particles in the film. Preferably the composition includes also a polishing wax or an alkali soluble resin, to cause the film to be removable by hot soapy water, and an alkali to neutralize the acidity. The alkali may be omitted when none of the other components used are acidic or develop acidity.

Our emulsions have many advantages in addition to the economy and wear resistance referred to above. They are non-flammable, easily applied, and easily cleaned from the brushes or other articles used in the application. When applied and allowed to dry by evaporation of the water, they leave behind a hard, tough, durable resinous film of excellent clarity, gloss, and high resistance to abrasion and to oils and greases. While the films become somewhat less hard when moist, they are not soluble in water. They are free from excessive tackiness, slipperiness, and brittleness. They show excellent adhesion to usual flooring and other structural materials including wood, linoleum, asphalt tile, rubber tile, terrazzo, plastics, metal, and painted, waxed, or lacquered surfaces, whether dull or glossy originally.

COMPONENTS

As the resin in the emulsion there is used a polymerized vinyl compound of resinous consistency. Examples of such polyvinyl resins that may be used are polyvinyl acetate, polyvinyl chloride-acetate, copolymerized styrene-butadiene, polyvinyl chloride, polyacrylates, and copolymerized vinylidene chloride-acrylonitrile. For best commercial results, including stability of emulsion, ease of processing and high gloss of the dried film, especially on surfaces that are rather porous initially, the vinyl resin used is polyvinyl acetate such as produced by polymerization of vinyl acetate in aqueous emulsion. In making this dispersed resin serving as one of our starting components, there is used to advantage a protective colloid such as gum arabic in the proportion of about 0.5 to 3 parts for 100 of the resin, and di-n-octyl sodium sulfosuccinate or like surface active agent in the proportion of about 0.1 to 0.5 part.

The selected resin, in any event, must be in the form of extremely fine particles of size averaging 0.6 micron or lower, preferably below 0.3 micron. The finest particles that can be produced are satisfactory so long as they are not in true solution. Particles averaging larger than 0.6 micron, on the other hand, do not give bright drying, durable film under all conditions of use. For the brightest films of the applied and then dried emulsions, we use particles of maximum average size 0.3 to 0.5 micron down to submicroscopic size, say less than 0.25 micron on the average.

As the surface active agent there is used a non-cationic material, i. e., either an anionic or non-ionic active agent. Such an agent has no objectionable effect upon the stability of the emulsion and gives the desirable combination of results discussed above. The agent used in our emulsion must be not only non-cationic but also soluble in water and dispersible in the resin so that there is no clouding of the final film of finishing material left after evaporation of the water. Examples of surface active agents that meet these general requirements are di-n-octyl sodium sulfosuccinate, the oleic acid condensate of polyethylene oxide, sodium salt of a secondary alkyl sulfate, aryl alkyl polyether alcohol and an aryl polyether alcohol. These agents may be used singly or in combination, including combinations of anionic and non-ionic materials.

The film coalescing agent which is used in our emulsion serves to prevent the separation of insoluble material with the production of an objectionable whitening effect in forming the film of finishing material. Examples of film coalescing agent that may be used are diethylene glycol diacetate, diacetin, tricresyl phosphate, dibutyl phthalate, butyl phthalyl butyl glycolate, methyl phthalyl ethyl glycolate, trimethyl glycol di-2-ethyl hexoate, and triethylene glycol di-2-ethyl butyrate. A number of these coalescing agents, including the phosphate and the phthalates, are known to be water-insoluble.

When the film coalescing agent is water soluble it may be used to serve also the function of the retarder of evaporation of water. Otherwise there is used a separate material as the retarder of evaporation.

The retarder is a water soluble material of boiling point above that of water. It must be compatible with the resin selected, that is, soluble in the mixed resin and film coalescing agent without causing separation of the resin, by precipitation, from the other said agent. In other words, the said agent is dispersible in the resin. It is a plasticizer for the resin.

Retarders that illustrate the class of materials to be used and that have been successfully employed in our emulsions are triethanolamine, the oleic acid condensate with polyethylene oxide known commercially as Neutronyx 228, the condensate of higher fatty acids other than oleic with polyglycol compounds known commercially as Neutronyx 332, ethyl lactate, diacetin, and diethylene glycol diacetate. Because these retarders are infinitely soluble in water, there is no separation of the retarder from the water (the sole readily volatile solvent) of the emulsion, as would be the case with a difficulty soluble and difficultly volatile material when the water evaporates during drying of a film of the composition on a surface.

Certain components, it will be noted, may serve more than one function when those components meet the requirements stated for two classes of components.

Certain additional components may be incorporated in addition to the essential classes discussed above.

It is considered advisable in some instances to preserve in the finished film the general properties of wax polishing films to which the general user is more or less accustomed. To produce such films that may be buffed or rubbed up, to eliminate or conceal scratches, scuff marks or other superficial abrasive effects, we incorporate waxes, or mixtures of waxes and resins that are soluble in the selected wax.

The polishing waxes employed are also of the type conventionally used in bright drying water wax dispersions. Examples are carnauba, candelilla, montan, microcrystalline petroleum waxes, and mixtures thereof. Into these waxes there may be incorporated the wax-soluble resins such as natural or synthetic resins or gums as heat processed ("run") Congo, terpenephenolic resins, and wood rosin.

A redispersion compound is preferably added for overcoming the substantially permanent adherence of the film to the surface to which applied, so as to make the film removable from a floor by scrubbing with hot soap and water. These are selected from compounds that are known to be soluble or dispersible in hot soapy water, insoluble in the polyvinyl resin at normal temperatures, adapted to give a bright film when deposited from a solution or dispersion, and nondispersible in cold water. Examples of such redispersion agents are the wax or wax and resin additives described above for serving also a different function in our composition. These are known to meet the general requirements here stated. Examples of other satisfactory redispersion compounds are the alkali-soluble resins. Representative ones of these are copal and shellac. As shown later herein these resins are dispersible in aqueous ammonia solutions. The resins are known in the art as ammonia soluble.

Incorporation of the conventional type of bright drying water wax dispersions and of the alkali soluble resin solutions into our compositions requires that the emulsions be on the alkaline side; a pH of about 7 to 10 being necessary.

To raise the pH of any emulsions which are below the requisite pH, it is satisfactory to add free alkali, triethanolamine being preferable for this purpose because of the fact that the salts it forms with free acid in the emulsion have a low crystallization temperature, as compared to the salts of most other alkalies, and because the triethanolamine can also function as the evaporation retarder as hereinbefore described. Other alkalies that may be used are ammonium and alkali metal hydroxides.

We have also added certain bright drying water wax dispersions to acidic dispersions without alkali neutralization. Although slightly alkaline in themselves, these wax dispersions, upon the addition of surface active agents of the type hereinbefore set forth, are rendered stable when incorporated into such acidic emulsions even though the final pH still remains on the acid side.

FUNCTIONS OF THE VARIOUS COMPONENTS

The functions of some of the components have been referred to briefly above. Functions of those components requiring more detailed presentation are discussed in this section.

The materials referred to by the means "film coalescing agent" and "retarder of evaporation of water" may be considered jointly as filming agents. The coalescing agent is a plasticizer.

The use of these agents prevents the whitening and embrittling effect obtained when films are laid down from the resin emulsions of the type described, particularly at low temperatures and humidities. The evaporation retarder, by making the loss of water from the film sufficiently slow as evaporation proceeds, permits the resin particles, because of their Brownian movement in a highly concentrated medium, to strike each other at a satisfactory rate, thus causing the particles softened by the coalescing agent to form into a continuous film. The result, in the absence of the filming materials, especially under conditions of low temperature and humidity, is a discontinuous, powdery white layer of discrete resin particles.

In addition to reducing or eliminating film whitening under the unfavorable conditions of low temperature and low humidity, the film coalescing agent also hastens and improves film formation at normal temperatures, leading to earlier attainment of water resistance in the film.

In order that finishing compositions may be applied easily and uniformly, by the usual methods of brushing, dipping or spraying, it is required that the compositions be adapted to wet the various types of surfaces to which application may be made, in spite of the dissimilarity of properties of the several components present. Most resin emulsions of the type indicated display poor wetting properties on smooth surfaces such as metal, leather, new linoleum, and lacquer. Moreover, where it is necessary to add non-water miscible filming agents such as a solvent type film coalescing agent or a modifying dispersion of waxes of the type described, such agent or modifying dispersion is preferably added in the form of a water dispersion. This form of addition is selected both to insure uniformity of incorporation and to prevent gelation or breaking of the polyvinyl resin emulsion due to premature coalescent of the dispersed resin particles.

We have found that, by the use of surface active agents over and above that employed originally in making the polyvinyl resin emulsion, an unexpected combination of results is obtained in that (1) the desired wetting and spreading of the emulsion over a wide variety of surfaces is obtained, (2) it is practicable to add, uniformly and without danger of gelation, coagulation or breaking of the emulsion, large quantities of filming agents and/or modifying wax dispersions at various pH levels of acidity or alkalinity, while (3) the water resistance of the finished film and its strong and durable adherence to the finished surface after drying are preserved. The explanation of the latter result is considered to be the fact that the surface active agent is dispersed in, and for that reason surrounded by, water impermeable resinous material in the finishing film.

It is considered that the removability feature, obtained from incorporation of such wax or resin additives, is due to the facts that films of such wax dispersions, resin dispersions, or solutions are in themselves water sensitive to the degree that they are more or less easily removable with hot soap and water and that their uniform dispersion throughout the resin film prevents complete coalescence of resin particles. This renders the entire film somewhat water sensitive and hence susceptible of removal with hot soap and water.

As to the function of the added alkali, we have also found that certain resin emulsions of the type indicated, particularly polyvinyl acetate emulsions, contain certain proportions of salt forming materials such as acetic acid and vinyl acetate, the latter hydrolyzing on aging to give acetic acid. On addition of an alkaline material, such as triethanolamine, or of alkaline wax or resin dispersions as described below in the examples of the preparation of removable finishes, acetate salts are formed by reaction of the acetic acid with the alkali. Such salts tend to crystallize at low temperatures and humidities, further increasing the whitening effect. However, upon addition of the film coalescing and evaporation retarder agents as described, the crystallization of such salts is effectively inhibited. It is considered desirable, nevertheless, to employ emulsions with minimum quantities of excess acids, the allowable limits of such excess acids and hydrolyzable esters being set forth below in specific examples of polyvinyl acetate emulsions and compositions prepared from such emulsions.

PROPORTIONS

Proportions of the several components may be varied in accordance with the properties of the film required in different uses of our emulsions.

Satisfactory and also the preferred proportions are shown in general in the following table, all proportions in this table and elsewhere herein being expressed as parts by weight.

| Ingredient | Parts for 100 Parts of Non-volatile Material | |
|---|---|---|
| | Satisfactory Range | Preferred Propostion |
| Film Coalescing Agent | 5-50 | 8-40 |
| Surface Active Agent | 1.5-15 | 3-10 |
| Evaporation Retarder | 1.5-15 | 3-10 |
| Redispersion agent | 3-70 | 7-35 |
| Polyvinyl resin | (¹) | (¹) |

¹ To make 100 parts total but not less than 25 parts.

In the case of polystyrene used as the emulsified resin base, the proportion of the coalescing agent may be 40 to 80 parts. For polyvinyl acetate as the resin base, the said agent should be used in the proportion of 5 to 18 parts. Three to 30 parts of a polishing wax are suitably included.

The proportion of the polyvinyl resin should be at least about 25% of the total solids in order to give the desired lustrous wear resistant film of finishing materials.

Lesser amounts of the added ingredients than the minimum shown in the table are ordinarily inadequate to give the full function of the added ingredient. Amounts in excess of the maximum shown do not give an increase in the effect commensurate with the added cost of the extra proportion of the ingredients added.

The polishing wax and redispersion agents may be omitted entirely if their functions are not desired.

METHOD OF MAKING AND USING OUR EMULSION

The resin emulsions of the type indicated as used in our embodiments may be formed or supplied in relatively concentrated form and then diluted with added water at or shortly before the time of preparation of the compositions or at the time of use by the ultimate consumer. Thus the emulsions may be made to contain, say 10 to 60 parts of the polyvinyl resin for 100 parts of the emulsion and then diluted down at the time of use to a lower concentration. In such emulsions, a conventional protective colloid is preferably used, as, for example, gum arabic, hydroxy ethyl cellulose, and polyvinyl alcohol, and an interfacial tension depressant as, for example, the di-n-octyl ester of sodium sulfo succinate. Emulsions that are particularly satisfactory for application upon a floor by brushing, for instance, are those made by adding the various additives and diluting the final composition to a concentration of about from 12 to 25 parts of total non-volatile ingredients for 100 parts of the total composition.

Although our compositions are primarily intended for application on flooring surfaces, we have found that by minor and non-critical adjustments in formulation, they may be readily employed for applying durable, glossy finishes on a wide variety of surfaces. These include automobile bodies, plastic articles, lacquered and painted surfaces generally, furniture, leather, paper, fruits and metal, a restriction being that the surface to which application is made be not so porous as to completely or almost completely absorb the compositions so that an insufficient amount of solid film-forming material is left exposed. Where the surface is porous, application of one or more sealer coats may be necessary before gloss is obtained. Alternatively a higher solids composition may prove satisfactory.

One of the auxiliary advantages of our compositions is that they can be manufactured generally without the use of heat, except where heat is required to prepare a wax, gum or resin dispersion to be added to the polyvinyl resin emulsion. Where only film coalescing agent, surface-active agents, or evaporation retarder of the type hereinbefore set forth are to be added, sufficiently rapid agitation is required to insure uniform dispersal but the entire procedure may be carried out at room temperature thus effecting obvious savings. Although wax, gum and resin dispersions or solutions may require heat for preparation, after preparation they may be added to the polyvinyl resin dispersion cold, in the manner indicated below.

The combined use of the non-removable and removable type compositions as herein described results in definite advantages in finishing surfaces, particularly those subject to heavy wear, as, for example, floors on which there is a constant stream of traffic. Application may first be made of a non-removable type of composition, so as to seal the surface and provide a tough glossy base. A removable type composition is then placed over the non-removable base coat. As abrasion causes scratching or marring of the surface the top coat may be removed by scrubbing with hot soap and water, leaving the base coat intact after which a new top coat may be applied, the original flooring surface remaining protected throughout the entire process.

The following formulas represent satisfactory compositions in accordance with the invention.

PREPARING DISPERSIONS FOR USE IN FINAL COMPOUNDING

The following wax, resin and gum dispersion are employed as components and additives in certain of our embodiments set forth below and hence are displayed here.

*Copal dispersion*

| | Pounds |
|---|---|
| Manila DBB copal | 153 |
| Ammonia, 26° Bé | 61 |
| Water | 636 |
| | 850=100 gals. |

The dispersion is prepared by stirring the ingredients at an elevated temperature not above 60° C. until the copal is completely "cut" or reacted with the alkali. Then filter non-dispersibles and make-up with water to 12% solids.

*Shellac dispersion*

| | Pounds |
|---|---|
| Shellac | 102 |
| Ammonia, 26° Bé | 25½ |
| Water | 722½ |
| | 850=100 gals. |

The dispersion is prepared by stirring the ingredients at a temperature of from 80° to 100° C. until the shellac is completely "cut" or reacted with the alkali.

*Self-polishing wax dispersion A*

| | lbs. | gals. |
|---|---|---|
| PART A | | |
| Petroleum wax | 21¾ | |
| Candelilla wax | 21¾ | |
| Carnauba wax, No. 3 NC refined | 10¾ | |
| Oleic acid | 10 | |
| Triethanolamine | 5 | |
| PART B | | |
| Borax | 5 | |
| Water | 25 | 3 |
| PART C | | |
| Water | 495¾ | 59½ |

Part A is melted and heated to a temperature of 95° to 100° C. Part B is raised to the same temperature and added slowly to Part A with vigorous and rapid agitation. Part C is then added, also at the same temperature. The dispersion is finally cooled with agitation.

A polystyrene emulsion is used at a solids concentration of 40%. The resin is polystyrene of molecular weight approximately 500,000.

A polyvinylidene chloride-acrylonitrile emulsion is used at a solids concentration of 56%. The resin is a copolymer of vinylidene chloride and acrylonitrile, the particle size of the dispersed resin phase ranging from 0.08–0.15 micron.

Polyvinyl chloride emulsion is used at 56% solids. The resin contains a polymer of vinyl chloride and 35% dioctyl phthalate plasticizer on the weight of unplasticized resin, the plasticizer having been incorporated into the resin during the polymerization process.

A polyvinyl chloride-acetate emulsion is used at a concentration of 52% solids. The resin is a copolymer of vinyl chloride-vinyl acetate.

A polyacrylic emulsion is used at a solids concentration of 30%. The resin is a copolymer of acrylic acid derivatives, the hardness of the resin being designated as "medium."

The polyacrylate resins contain from 25% to 50% solids and are generally of the non-tacky type.

POLYVINYL ACETATE EMULSIONS

Polyvinyl acetate emulsions are used at about 35% solids. The resin is polyvinyl acetate produced by polymerization of vinyl acetate in aqueous emulsion, the particle size of the dispersed resin phase ranging from 0.035–0.28 micron. As hereinbefore noted, the presence of residual vinyl acetate and acetic acid in these emulsions tends to affect the appearance of films laid down from certain of our compositions employing these emulsions, this being particularly true at low temperatures and humidities, the effect being due to the formation of salts upon reaction with alkaline additives. Moreover, the presence of vinyl acetate in the emulsions introduces a slight amount of odor which we prefer to eliminate as nearly as possible, due to the otherwise completely odorless nature of this type of emulsion.

For this reason we prefer to use polyvinyl acetate emulsions in which the total residual acetic acid is below 0.2% on the weight of emulsion, although a total acetic acid percentage as high as 0.5% is allowable. Similarly we prefer to employ polyvinyl acetate emulsions in which the total vinyl acetate is below 0.2% on the total weight of emulsion. Because of the possibility of the vinyl acetate serving as source of further acetic acid, the total combined percentages of the acetic acid and vinyl acetate should be no greater than 0.5% on the weight of polyvinyl acetate emulsion.

In the following examples, the figures represent parts by weight. It will be understood that certain of the active materials may be diluted with unobjectionable conventionally used inert materials, as in proportions shown in certain formulas.

EXAMPLES OF COMPLETE FINISHING COMPOSITIONS—NON-REMOVABLE TYPE

Example 1

PART A

| | |
|---|---|
| Polyvinylidiene chloride - acrylonitrile latex | 45 |

PART B

| | |
|---|---|
| Butyl phthalyl butyl glycolate | 10 |
| Ethyl lactate | 3.5 |
| Oleic acid condensate of polyethylene oxide, 25% active mat'l | 20 |
| Water | 21.5 |

Example 2

| | |
|---|---|
| Polyvinyl chloride emulsion | 50 |
| Oleic acid condensate of polyethylene oxide, 25% | 8 |
| Triethanolamine | 3 |
| Water | 39 |

Example 3

| | |
|---|---|
| Polyvinyl acetate | 28 |
| Triethanolamine | 1 |
| Dibutyl phthalate | 1 |
| Oleic acid condensate of polyethylene oxide, 25% | 4 |
| Water | 66 |

Example 4

| | |
|---|---|
| Polyvinyl acetate | 28 |
| Triethanolamine | 1 |
| Dibutyl phthalate | 1 |
| Aryl polyether alcohol, 25% active material | 4 |
| Water | 66 |

REMOVABLE TYPE OF FINISHING COMPOSITION

Example 5

PART A

| | |
|---|---|
| Polyvinylidine chloride - acrylonitrile emulsion | 36 |

PART B

| | |
|---|---|
| Triethanolamine | 2 |
| Dibutyl phthalate | 6.5 |
| Oleic acid condensate of polyethylene oxide, 25% act. mat | 3 |
| Di-n-octyl sodium sulfosuccinate, 25% act. mat | 3 |
| Water | 16 |

PART C

| | |
|---|---|
| Wax dispersion A | 17 |
| Oleic acid condensate of polyethylene oxide, 25% | 1.5 |
| Di-n-octyl sodium sulfosuccinate 25% | 1.5 |
| Water | 13.5 |

Example 6

PART A

| | |
|---|---|
| Polyvinyl acetate emulsion | 25 |

PART B

| | |
|---|---|
| Triethanolamine | 1 |
| Dibutyl phthalate | 1 |
| Oleic acid condensate of polyethylene oxide, 25% | 2 |
| Water | 25 |

PART C

| | |
|---|---|
| Wax dispersion A | 10 |
| Oleic acid condensate of polyethylene oxide, 25% | 2 |
| Water | 34 |

Example 7

PART A

| | |
|---|---|
| Polyvinyl acetate emulsion | 25 |

PART B

| | |
|---|---|
| Triethanolamine | 1 |
| Dibutyl phthalate | 1 |
| Oleic acid condensate of polyethylene oxide, 25% | 4 |
| Water | 25 |

PART C

| | |
|---|---|
| Shellac dispersion | 10 |
| Oleic acid condensate of polyethylene oxide, 25% | 4 |
| Water | 30 |

The procedures employed for preparation of the foregoing samples are as follows:

In making the non-removable types of Examples 1 to 4, the ingredients other than the resin emulsion (first line of the formulas) are preferably mixed together before the addition to the resin emulsion.

In all the examples, the average size of the particles in the said resin emulsion was less than 0.3 micron.

Examples 1 through 7 are prepared by dispersing or dissolving all the materials with the exception of the resin emulsion so as to give a uniform dispersion or solution. This may be done with vigorous, rapid agitation. This dispersion or solution is then added slowly, with vigorous agitation, to the resin emulsion. After complete mixing has taken place, the composition is ready for use.

Examples 5–7 are prepared by mixing, dispersing or dissolving the various indicated parts so that each part is itself in a uniform condition. The various parts are then mixed in the order indicated, each being added slowly with vigorous agitation.

When applied to the surface to be finished, the compositions dry to good bright films.

To give a finish with a permanent base coat and a removable upper coat, there is applied first a composition of the non-removable film type (Examples 1 to 4), this is allowed to dry, and then there is applied a composition of removable kind illustrated in Examples 5–7.

It will be understood also that it is intended to cover all changes and modifications of the examples of the invention herein chosen for the purpose of illustration which do not constitute departures from the spirit and scope of the invention.

What we claim is:

1. A finishing composition giving a bright drying film when applied as a thin layer and dried upon a surface, the composition being an emulsion in water of particles of a polyvinyl resin of size averaging not above 0.6 micron, a water insoluble solvent plasticizer for the resin serving as a film-coalescing agent, an emulsified bright drying polishing wax selected from the group consisting of carnauba, candelilla, montan, microcrystalline petroleum waxes, and mixtures thereof in the proportion of 3 to 30 parts of the wax on the anhydrous basis to 100 parts of the total materials other than water in the finishing composition, a non-cationic surface active agent that is soluble in water and dispersible in the resin, and a retarder of evaporation of water, the retarder of evaporation being a liquid of boiling point above 100° C. that is soluble in the mixed resin and said agent and infinitely soluble in water and the water constituting the sole readily volatile ingredient of the composition.

2. A finishing composition as described in claim 1 including an additional resin selected from the group consisting of copal and shellac, the additional resin being dispersible in hot soapy water.

3. A finishing composition as described in claim 1, the said emulsion being an emulsion of copolymerized vinylidene chloride-acrylonitrile.

4. A finishing composition as described in claim 1, the said emulsion being an emulsion of polyvinyl chloride.

DANIEL SCHOENHOLZ.
HERBERT TERRY.

REFERENCES CITED

The following references are of record in the file of this patent:

UNITED STATES PATENTS

| Number | Name | Date |
| --- | --- | --- |
| 2,125,527 | Tyce et al. | Aug. 2, 1938 |
| 2,211,266 | Gibello | Aug. 13, 1940 |
| 2,346,891 | Adlington | Apr. 18, 1944 |
| 2,387,967 | Zimmerman | Oct. 30, 1945 |
| 2,392,135 | Farr | Jan. 1, 1946 |
| 2,413,197 | Smith et al. | Dec. 24, 1946 |
| 2,444,396 | Collins et al. | June 29, 1948 |

OTHER REFERENCES

India Rubber World, April 1946, page 83.